US008677331B2

(12) United States Patent
Marathe et al.

(10) Patent No.: US 8,677,331 B2
(45) Date of Patent: Mar. 18, 2014

(54) LOCK-CLUSTERING COMPILATION FOR SOFTWARE TRANSACTIONAL MEMORY

(75) Inventors: Virendra J. Marathe, Florence, MA (US); David Dice, Foxboro, MA (US)

(73) Assignee: Oracle International Corporation, Redwood City, CA (US)

( * ) Notice: Subject to any disclaimer, the term of this patent is extended or adjusted under 35 U.S.C. 154(b) by 124 days.

(21) Appl. No.: 13/250,369

(22) Filed: Sep. 30, 2011

(65) Prior Publication Data
US 2013/0086348 A1  Apr. 4, 2013

(51) Int. Cl.
*G06F 9/45* (2006.01)
*G06F 9/44* (2006.01)

(52) U.S. Cl.
USPC ........... 717/140; 717/152; 717/158; 717/163; 717/164

(58) Field of Classification Search
USPC .......................................................... 717/152
See application file for complete search history.

(56) References Cited

U.S. PATENT DOCUMENTS

| 8,539,486 | B2 * | 9/2013 | Cain et al. ...................... 718/100 |
| 2007/0156780 | A1 * | 7/2007 | Saha et al. .................... 707/202 |
| 2008/0005737 | A1 * | 1/2008 | Saha et al. .................... 718/100 |
| 2008/0034359 | A1 * | 2/2008 | Duffy et al. ................... 717/152 |
| 2008/0040560 | A1 * | 2/2008 | Hall et al. ...................... 711/152 |
| 2008/0098181 | A1 * | 4/2008 | Moir et al. ..................... 711/152 |
| 2009/0235254 | A1 * | 9/2009 | Michael .......................... 718/101 |
| 2010/0023706 | A1 * | 1/2010 | Christie et al. ................ 711/150 |
| 2010/0070727 | A1 * | 3/2010 | Harris et al. .................. 711/163 |
| 2010/0162249 | A1 * | 6/2010 | Shpeisman et al. ........... 718/101 |
| 2010/0251239 | A1 * | 9/2010 | Casas et al. .................... 718/100 |
| 2010/0332538 | A1 * | 12/2010 | Gray et al. ..................... 707/774 |
| 2011/0016470 | A1 * | 1/2011 | Cain et al. ..................... 718/101 |
| 2011/0125973 | A1 * | 5/2011 | Lev et al. ....................... 711/153 |
| 2011/0185359 | A1 * | 7/2011 | Chakrabarti ................... 718/101 |

OTHER PUBLICATIONS

Ting-Han Shen and Chih-Ping Chu, "Using Group Fine-grained Locking Scheme in Software Transactional Memory for Multiprocessing Systems", 2010, IEEE, 952-958.*
Ali-Reza Adl-Tabatabai, Brian T. Lewis, Vijay Menon, Brian R. Murphy Brain Saha and Tatiana Shpeisman, "Compiler and Runtime Support for Efficient Software Transactional Memory", Jun. 10, 2006, ACM, pp. 26-37.*
Tim Harris, Mark Plesko, Avraham Shinnar, and David Tarditi, "Optimizing Memory Transactions," Jun. 11-14, 2006, ACM, 12 pages.
Ali-Reza Adl-Tabatabai, et al., "Compiler and Runtime Support for Efficient Software Transactional," Jun. 10-16, 2006, ACM, pp. 26-37.

(Continued)

*Primary Examiner* — Isaac Tecklu
*Assistant Examiner* — Roberto E Luna
(74) *Attorney, Agent, or Firm* — Robert C. Kowert; Meyertons, Hood, Kivlin, Kowert & Goetzel, P.C.

(57) ABSTRACT

A lock-clustering compiler is configured to compile program code for a software transactional memory system. The compiler determines that a group of data structures are accessed together within one or more atomic memory transactions defined in the program code. In response to determining that the group is accessed together, the compiler creates an executable version of the program code that includes clustering code, which is executable to associate the data structures of the group with the same software transactional memory lock. The lock is usable by the software transactional memory system to coordinate concurrent transactional access to the group of data structures by multiple concurrent threads.

20 Claims, 6 Drawing Sheets

(56) References Cited

OTHER PUBLICATIONS

Cheng Wang, et al. "Code Generation and Optimisation for Transactional Memory Constructs in an Unmanaged Language," International Symposium on Code Geneartion and Optimization, 2007, IEEE, 12 pages.

Yang Ni, Adam Welc, et al., "Design and Implementation of Transactional Constructs for C/C++," Oct. 19-23, 2008, ACM, 17 pages.

Aleksandar Dragojevic, "Optimizing Transactions for Captured Memory," Aug. 11-13, 2009, ACM, pp. 214-222.

* cited by examiner

LOCK-CLUSTERING COMPILATION FOR SOFTWARE TRANSACTIONAL MEMORY

BACKGROUND

In some computer programs, multiple program threads may execute concurrently on a single system and may access shared memory areas. The interleaved execution of such threads in shared-memory, multi-threaded computing environments may cause one or more of the threads to execute incorrectly.

Programmers of concurrent systems must take care to avoid inopportune interleavings of concurrent operations. To ensure correctness, programmers often rely on various concurrency control mechanisms, such as synchronization locks. A lock is a software or hardware construct associated with one or more memory areas that is used to restrict concurrent access to those memory areas. For example, a lock may allow only one thread at a time to hold the lock, and therefore to have exclusive access to the memory areas protected by that lock. Some locks may allow some concurrency. For example, read-write locks allow multiple concurrent readers but only one writer at a time.

Transactional memory is a concurrent programming paradigm that allows programmers to designate sections of code that must each be executed as a single atomic transaction. Such sections may be referred to as critical sections or atomic sections. When a programmer creates a critical section, a transactional memory implementation ensures that the section is executed as an atomic transaction with respect to all other threads in the system. Executing the critical section as an atomic transaction implies executing the section such that no other thread observes results from a partial execution of the critical section and/or that no other thread modifies memory that is accessed from within the critical section while the critical section executes. Transactional memory may be implemented in software, hardware, or both.

Transactional Locking (TL) is a software-based, transactional memory (STM) technique that ensures the atomicity of transactions using locks. In traditional TL systems, each memory area is mapped by the STM to a single lock that manages concurrency and coordinates access to the associated data areas. Each memory area mapped to a lock may correspond to a respective memory object (i.e., object-based systems) or to other arbitrary stripes of memory (i.e., in stripe-based systems).

When a thread in a TL system executes a transaction, the STM ensures that the transaction is executed atomically with respect to other threads in the system. The STM transparently obtains and releases the locks associated with each memory area that the transaction accesses. In systems that use different types of locks (e.g., mutually exclusive, read/write locks, etc.), the STM may acquire each lock in the proper mode.

Traditional locking STMs tend to perform lock acquisitions and releases often. Therefore, the overhead introduced by these operations may be an important determinant of the system's overall performance. Unfortunately, lock acquisition and release operations are often expensive. For example, in various traditional schemes, lock acquisition and/or release may necessitate that one or more high-latency atomic instructions, such as a compare-and-swap (CAS) instruction, be executed. Accordingly, considerable effort has been devoted to developing STM algorithms that avoid or reduce the frequency of atomic (e.g., CAS) operations.

Lock clustering is a dynamic STM technique for reducing the number of lock acquisitions and releases that a system must perform. In lock clustering, the system monitors memory access during runtime, determines clusters comprising memory areas that are frequently accessed together, and associates each cluster with a respective lock, such that concurrent access to the memory areas of the cluster is controlled using the common lock.

SUMMARY

A lock-clustering compiler is configured to compile program code for a software transactional memory system. The compiler determines that a group of data structures are accessed together within one or more atomic memory transactions defined in the program code. In response to determining that the group is accessed together, the compiler creates an executable version of the program code that includes clustering code, which is executable to associate the data structures of the group with the same software transactional memory lock. The lock is usable by the software transactional memory system to coordinate concurrent transactional access to the group of data structures by multiple concurrent threads.

In some embodiments, the compiler may determine that the group of data structures is accessed together by performing a static analysis of the program source code. The compiler may determine that the group is accessed together by analyzing dynamic access patterns. In different embodiments, the compiler may receive the dynamic access patterns from previous profiling executions of the code or the information may be leaked to the compiler from a runtime environment. A just-in-time compiler may use the leaked information to perform the compilation at runtime.

In various embodiments, the clustering code may associate each data structure in the group with the lock by manipulating metadata in the header of the data structure. Alternatively, the compiler may manipulate a lock record to which the software transactional memory system maps the data structure.

In some embodiments, the compiler may optimize the executable version of the code by ensuring that no transaction in the executable attempts to acquire or release the lock more than once during any given transaction attempt.

In some embodiments, the compiler may decluster the group in response to detecting that the clustering is causing high contention. For example, the compiler may receive an indication (e.g., from a contention manager) that there is high contention on the lock. In response, the compiler may recompile at least a portion of the program code to associate at least one of the data structures with a different software transactional memory lock instead of the group's lock.

Figure 1:
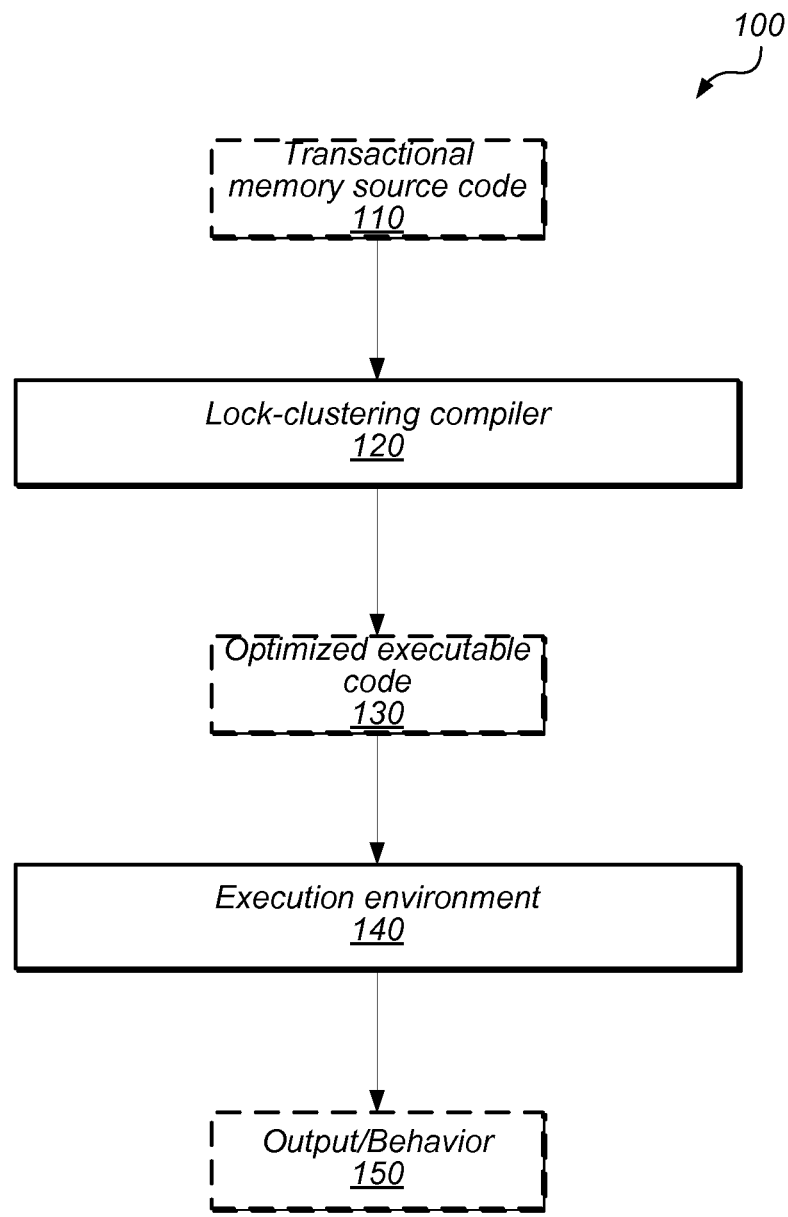
FIG. 1 illustrates a workflow for compiling and executing a transactional computer program using a lock-clustering compiler, according to various embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

A software transactional memory system (STM) executing a memory transaction may need to acquire and release multiple STM locks, each controlling access to a respective portion of shared memory (e.g., an object). Such acquisition and release may introduce considerable performance overhead, particularly given the high-latency instructions that are often required to complete the lock and release. For example, performing a lock acquisition or release may include executing expensive atomic compare-and-swap (CAS) instructions.

Lock clustering is a runtime technique that monitors dynamic memory access patterns that emerge as a program executes and then reconfigures lock assignments (i.e., which memory areas are controlled by which locks) to reduce the number of STM lock acquisitions and releases that the STM must perform. For example, if the lock clustering system determines that three objects are frequently accessed together within the same transaction, the system may associate those three objects with the same STM lock instance. Therefore, a transaction that acquires the lock instance gains access to all three objects without the need to contend for three different lock instances. A dynamic STM lock-clustering technique is disclosed in U.S. patent application Ser. No. 12/634,640 entitled Fast and Efficient Reacquisition of Locks for Transactional Memory Systems.

The lock-clustering technique of U.S. patent application Ser. No. 12/634,640 is limited in that it only performs clustering by installing forwarding pointers in lock records. That technique therefore suffers from the limitation that the system must still execute the same program instructions, but with different conditionals and targets. Additional advances in STM performance are desirable.

According to various embodiments, a lock-clustering compiler may be configured to improve the performance of lock-clustering STMs. The compiler may be configured to determine clusters of memory areas that are often accessed together within one or more transactions, such as by static locality analysis of the code or by receiving dynamic feedback from the runtime system. In response to determining a cluster, the compiler may compile program code to include instrumentation code that maps the memory areas in a given cluster to the same STM lock (cluster lock). For example, in different scenarios, the instrumentation code may be inserted at the point where an object is instantiated or accessed. In some embodiments, the compiler may perform additional optimizations, such as eliminating redundant lock acquisition attempts. In some embodiments, a just-in-time (JIT) compiler may receive hints regarding dynamic memory access patterns from the runtime system and perform additional compilation activities to further cluster or decluster the memory areas. In this context, clustering refers to configuring a lock to control access to additional memory areas, and declustering refers to configuring a lock to control access to fewer memory areas.

FIG. 1 illustrates a workflow 100 for compiling and executing a transactional computer program using a lock-clustering compiler, according to various embodiments. In FIG. 1, solid outlines indicate operational components 120 and 140 and dashed outlines (e.g., 110, 130, and 150) indicate data passed between these components.

According to the illustrated embodiment, the workflow begins when a lock-clustering compiler, such as 120, receives source code for a transactional computer program, such as 110. The term transactional program refers to a computer program that includes critical sections designated as transactions. In various embodiments, source code 110 may be specified in various high-level programming languages, such as Java™, C, C++, etc. In some embodiments, the programming language may include special-purpose instructions for designating transactional regions. However, in some embodiments, the compiler may infer transactional regions from locking semantics specified within program. In various embodiments, source code 110 may be specified using a combination of languages, which may include one or more low-level and/or intermediate languages (e.g., assembly, Java byte code).

According to the illustrated embodiment, compiler 120 may compile source code 110 into an optimized executable version, such as 130. In various embodiments, optimized executable code 130 may include instrumentation code to create efficient lock clustering. Code 130 may be encoded in a binary machine language, an interpreted intermediate language (e.g., byte-code), and/or in other various executable formats. In some instances, different parts of the executable code 130 may be encoded in different formats.

As part of compiling program source code 110 into width-specific executable code 130, compiler 120 may determine clusters of memory areas accessed together, as discussed below. For example, the compiler may perform static analysis of the source code 110 using various techniques and/or receive locality hints from the runtime system.

As illustrated in FIG. 1, the optimized executable code 130 may be executed in an execution environment, such as 140. Execution environment 140 may execute the code, which results in various output data and/or behavior 150. In various embodiments, execution environment 140 may include a physical computer system, a virtual machine, a software environment, support libraries, and/or various other components usable to execute code 130, either directly or by interpretation.

In different circumstances, output/behavior 150 may include data stored in various levels of system memory (e.g., in-memory objects and/or data structures), on persistent storage (e.g., files on a file system), etc. Behavior 150 may also include various program functionalities, such as displaying output on a screen, sending messages over a network, and/or otherwise interacting with various users and/or components.

Figure 2:
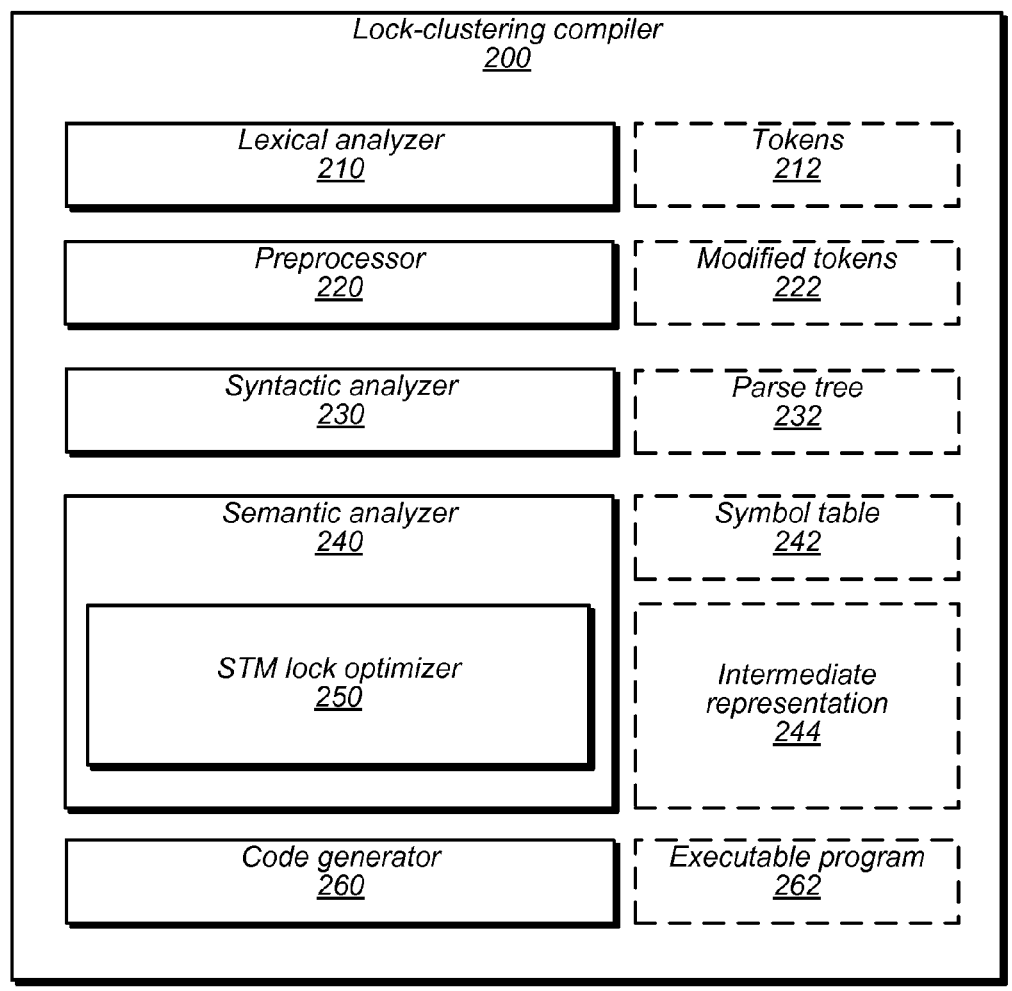
FIG. 2 is a block diagram illustrating the components of a lock-clustering compiler configured to implement various methods/systems described herein.

FIG. 2 is a block diagram illustrating the components of a lock-clustering compiler configured to implement various methods/systems described herein. According to various embodiments, the compiler may be implemented in software and executed by a computer system on given source code, such as source code 110. As in FIG. 1, solid outlines in FIG. 2 indicate functional components while dashed lines indicate data structures passed among the functional components.

Compiler 200 represents just one possible example of a lock-clustering compiler. In other embodiments, the compiler may include fewer, additional, and/or various other components not pictured in FIG. 2. It is intended that this disclosure cover all such embodiments wherein a compiler is configured to create an STM lock-cluster optimized executable program (or component) that reduces the number of STM lock acquisitions and/or releases.

According to the illustrated embodiment, lock-clustering compiler 200 includes lexical analyzer 210, which may be configured to break the input source code into tokens, such as tokens 212. Each token 212 may correspond to a single atomic unit of the given language, such as keywords, identifiers, etc. In various embodiments, the token syntax may be represented as a regular language.

According to the illustrated embodiment, compiler 200 may include preprocessor 220, which may be used to support macro substitution in some languages. In some embodiments, preprocessor 220 may modify various ones of tokens 212, which may result in a set of modified tokens, such as 222.

Compiler 200 also includes syntactic analyzer 230, which may be configured to parse the modified tokens 222 to identify syntactic structure of the input program. The syntactic analyzer may be configured to build a parse tree, such as parse tree 232, which may organize the tokens of 222 into a tree structure according to the formal grammar of the programming language of the source code.

Compiler 200 further includes a semantic analyzer 240, which may be configured to add semantic information to parse tree 232 to create an annotated internal representation of the program, such as intermediate representation 244. In some embodiments, semantic analyzer 240 may also build and/or maintain a symbol table, such as symbol table 242, which maps various symbols in the source code to associated information, such as the location, scope, and/or type.

Semantic analyzer 240 may implement various lock-clustering compilation mechanisms, such as by using STM lock optimizer 250. STM lock optimizer 250 may be configured to generate an intermediate representation that creates STM lock clusters and thus obviates some number of lock-acquisition and/or release operations that executing the code may require.

In some embodiments, a code generator, such as code generator 260, may convert the intermediate representation 244 into an executable program, such as 262. Executable program 262 may be encoded in binary, byte code, and/or in another representation and may correspond to executable code 230 in FIG. 2.

In various embodiments, different components of compiler 200 may be combined or further deconstructed into multiple components. The compiler may implement additional or fewer functions, lock-clustering compilation mechanisms may be implemented by various components and/or even by different compilers. For example, with Just-In-Time (JIT) compilation, a compiler may create an intermediate representation (e.g., 244) that it (or another compiler) may later manipulate into different executable programs (e.g., 262) depending on runtime conditions.

Figure 3:
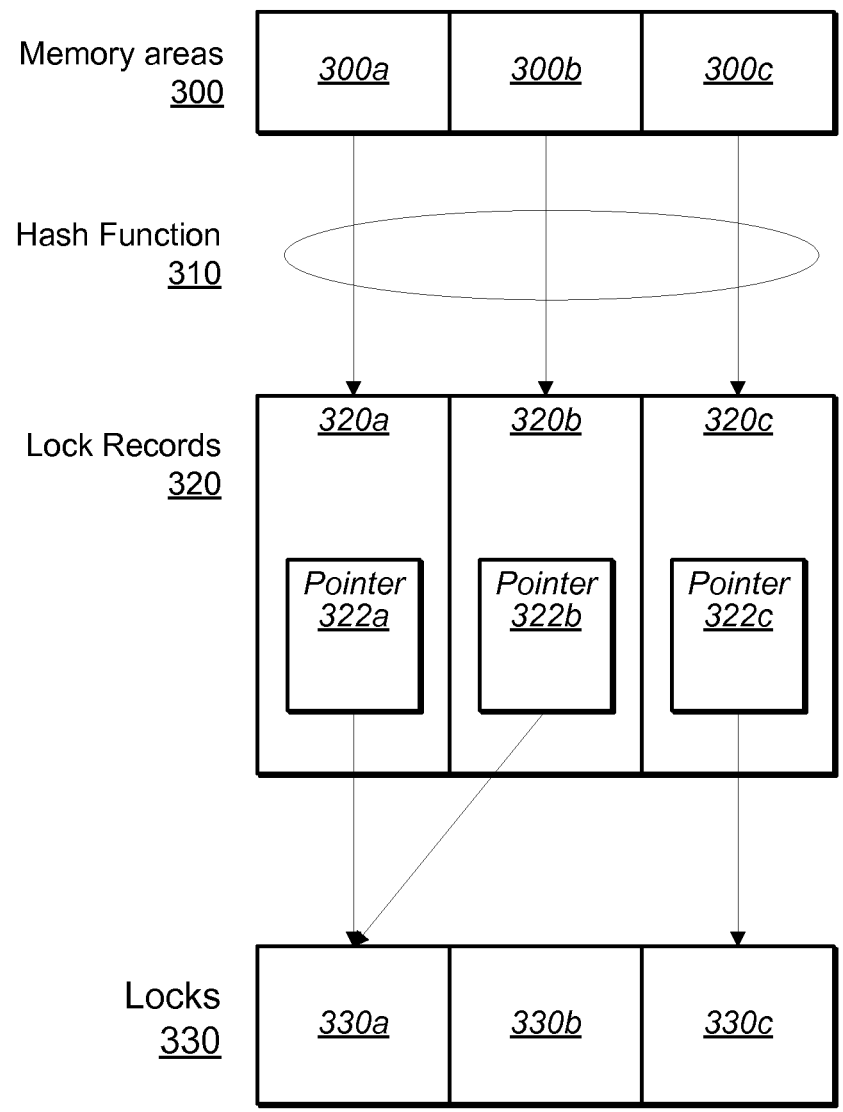
FIG. 3 is a block diagram illustrating one configuration for associating memory areas with STM locks in a manner that facilitates lock clustering, according to some embodiments.

FIG. 3 is a block diagram illustrating one configuration for associating memory areas with STM locks in a manner that facilitates lock clustering, according to some embodiments. Each of memory areas 300 may correspond to a respective object instance, data structure, or any other portion of shared memory.

According to the illustrated embodiment, each of memory areas 300 is mapped to a respective lock record 320, which may be achieved using different methods in different embodiments. For example, a memory address of each memory area (e.g., the start address) may be hashed using a hash function, such as 310, to produce an index into an array of lock records 320. In some embodiments, hash function 310 may be chosen based on one or more particular properties governing its expected probability distribution. For example, a hash function that produces a uniform distribution of indices given the expected inputs (e.g., memory area addresses) may be chosen to distribute load evenly across lock records 320. In some embodiments, multiple memory areas may be mapped to the same lock record (e.g., if the hash function of their respective memory addresses results in the same value).

Each lock record 320 may be associated with a unique STM lock 330. This may be done, as in FIG. 3, using pointers. For example, in FIG. 3, each lock record 320 includes a respective pointer 322 to a respective one of locks 330. Each pointer 322 may contain a respective memory address usable to locate the respective one of locks 330 to which the lock record maps.

Using the pointer scheme illustrated in FIG. 3, multiple lock records 320 may point to the same lock 330. For example, pointers 322a and 322b (of lock records 320a and 320b respectively) both point to 330a. Thus memory areas 300a and 300b are clustered because both are mapped to the same lock 330. Thus, in pointer-type embodiments, such as that illustrated in FIG. 3, each memory area 300 of a given cluster corresponds to the same lock 330, although not necessarily to the same lock record 320.

In some embodiments, the values of pointers 322 may be set by instrumentation code inserted by the lock-clustering compiler. For example, in response to a static analysis that reveals that memory areas 300a and 300b are frequently accessed together within one or more transactions, the compiler may determine the lock records to which the those memory areas map (i.e., 320a and 320b), and insert instrumentation code that sets the pointers of those lock records (i.e., 322a and 322b) to point to the same lock record (i.e., 330a).

In some embodiments, the mapping between memory areas and locks may be performed using mechanisms other than by hash function mapping, as in FIG. 3. For example, in object-oriented systems (e.g., Java™), the lock record pointers 322 may be embedded within the object itself. For example, the lock record pointer may be included in an object's header information.

Figure 4:
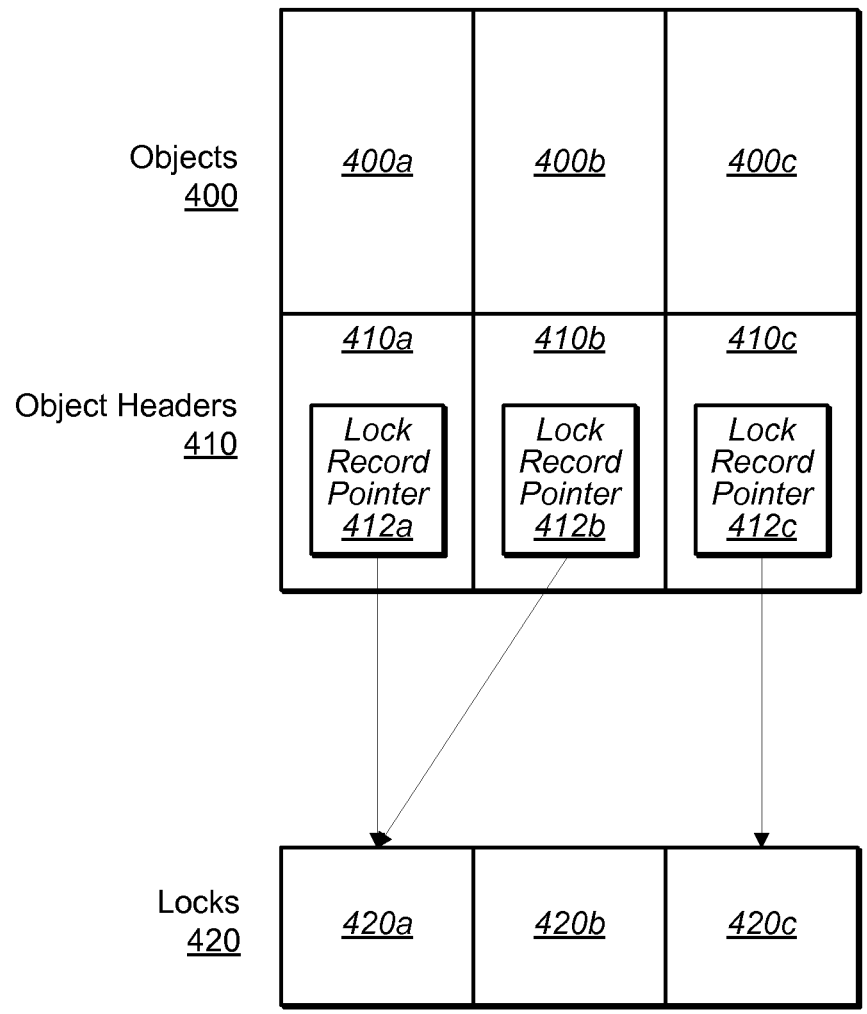
FIG. 4 is a block diagram illustrating a configuration for associating in-memory objects with STM locks using object headers, according to some embodiments.

FIG. 4 is a block diagram illustrating a configuration for associating in-memory objects with STM locks using object headers, according to some embodiments. According to FIG. 4, objects 400 are in-memory objects allocated by the runtime system. Each of the objects 400 includes a respective object header 410, which in turn includes a respective lock record pointer 412. Lock record pointers 412 may be analogous to pointers 322 of FIG. 3. For example, each pointer 412 may contain a respective memory address usable to locate the respective one of locks 420 that controls concurrent access to the object.

As in FIG. 3, different ones of lock record pointers 412 may point to the same lock 420. For example, pointers 412a and 412b (of objects 400a and 400b respectively) both point to lock 420a. Thus objects 400a and 400b are clustered using lock 420a. As detailed below, a lock-clustering compiler may be configured to detect a cluster of objects that are likely to be accessed together and to insert instrumentation code that sets the lock record pointer 412 of each object in the cluster to point to the same lock 420.

Figure 5:
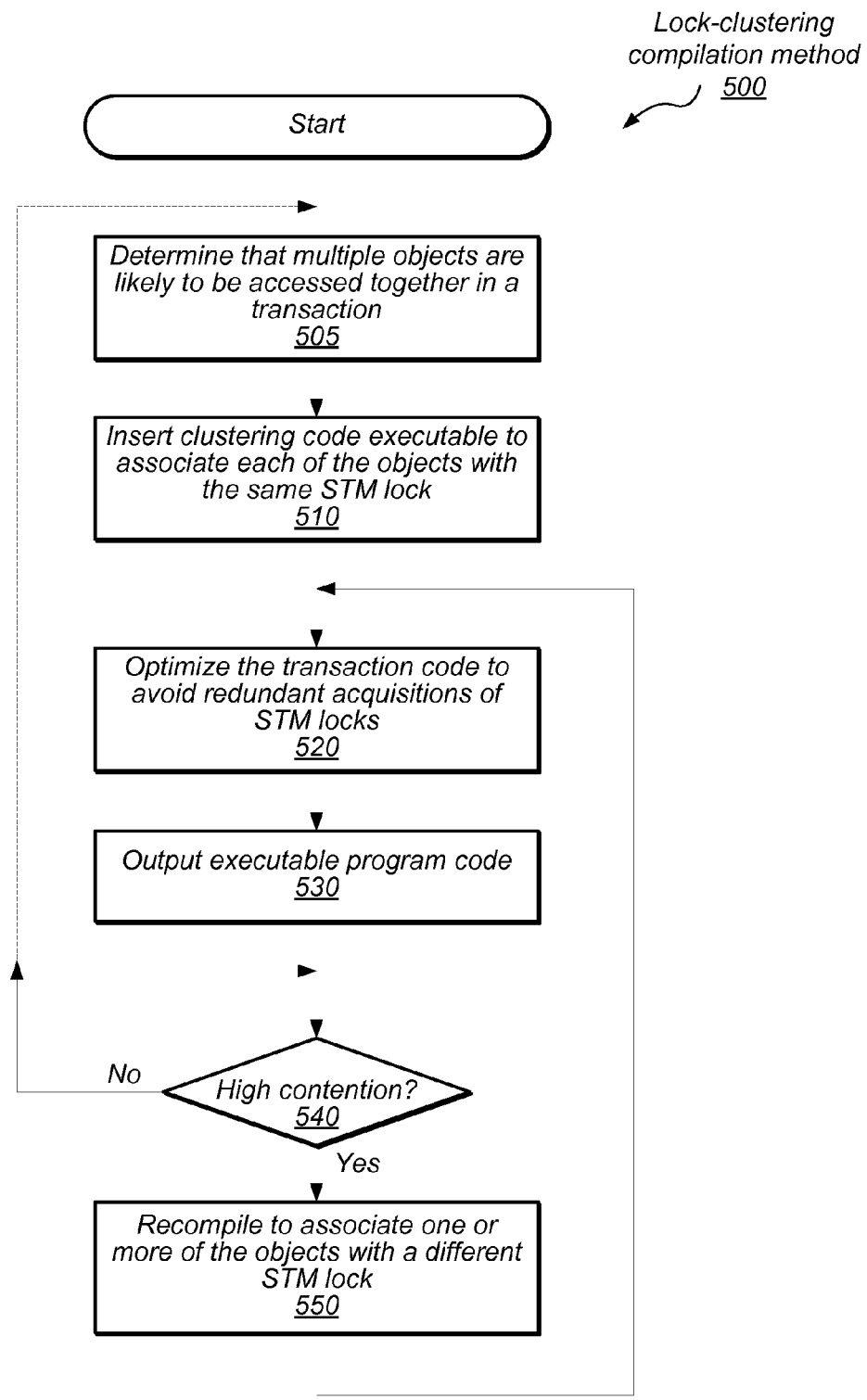
FIG. 5 is a flow diagram illustrating a lock-clustering compilation method, according to some embodiments.

FIG. 5 is a flow diagram illustrating a lock-clustering compilation method, according to some embodiments. Method 500 may be implemented by a lock-clustering compiler, such as 200, of FIG. 2. For convenience, method 500 is described in terms of objects with lock record pointers in the object headers, as shown in FIG. 4. However, it should be understood that the method applies also to STMs that protect memory areas other than objects, such as strings, arrays, and/or any other portion of shared memory. Therefore, in various embodiments, the lock-mapping scheme used may correspond to that of FIG. 3, FIG. 4, or other mapping configurations.

Compilation method 500 begins (in 505) by determining that multiple memory areas are likely to be accessed together in a given transaction. In various embodiments (or at different times), the determination of 505 may be made using static (i.e., pre-runtime) or dynamic (i.e., at runtime) analysis.

In step 505, the compiler may perform static analysis of the program source code to determine groups of objects that are accessed together from within transactions. Various techniques exist in the art for statically performing locality analysis on program source code. Using such techniques, a static analyzer may discover cluster information that identifies groups of objects that are frequently accessed together within the same transaction and the places in the code where the objects are accessed together. The static analyzer may report the cluster information using a database, which may take different forms, such as an in-memory database or intermediate data structure. In various embodiments, the static analyzer may be implemented as part of semantic analyzer (e.g., 240), by a subcomponent of the semantic analyzer (e.g., STM lock optimizer 250), and/or by another component.

In some embodiments, the lock-clustering compiler may leverage runtime information to determine the clusters. Runtime information may refer to the dynamic memory access patterns of a program as it executes. According to various embodiments, the compiler may gather such information from the runtime system and/or from previously performed profiling runs of the code.

In some embodiments, a compiler may determine clusters by analyzing runtime information from previously execute profiling runs of the code. In such embodiments, a programmer or other administrator may execute the code using various memory instrumentation tools to monitor and analyze the dynamic memory access patterns performed by the code. The analyzed access patterns may then be recorded in various formats as profiling information, which may be fed to the compiler at compile-time. The compiler may use the profiling information to identify clusters of objects accessed together. One advantage of feeding the compiler profiling information from previous runs is that the technique may not require any specialized runtime environment to interact with the compiler during runtime. Additionally, the technique does not require JIT compilation facilities, which enable the compiler to recompile various sections of the code at runtime.

In some embodiments, a lock-clustering compiler may be configured to receive dynamic access pattern information from the runtime system and to employ JIT compilation techniques to recompile portions of the code during runtime. In such a system, a runtime-monitoring framework (e.g., that described in U.S. patent application Ser. No. 12/634,640) may discover clusters of memory objects that are accessed together within transactions and leak that information to the compiler. The compiler may then use that dynamic information to recompile various portions of the code so that the objects in the cluster are mapped to the same lock. Thus, the recompiled code may reduce lock acquisition and release overhead. In some embodiments, the compiler may leverage other components in the runtime system (e.g., a garbage collector) to determine object clusters.

According to method 500, after the compiler determines an object cluster (as in 505), the compiler may insert clustering code executable to associate each of the objects with the same STM lock, as in 510. For example, in the object-based configuration of FIG. 4, the compiler may insert clustering code to manipulate the objects' respective header information to point to the same STM lock. Such code, which explicitly associates objects with a given STM lock, may be referred to herein generally as clustering code.

In different instances, the compiler may insert clustering code at different points within the program. For example, if the compiler determines that the objects are frequently accessed together across different transactions (e.g., global counters that are often incremented in coordination), then the compiler may insert clustering code at the allocation sites of each of the objects. In some instances, if the objects have a narrower scope (e.g., a single function), the compiler may insert the clustering code at the assignment site, call site, at the beginning of a transaction, or at other points in the code. In yet other instances, if the compiler determines that access patterns are prone to change, the compiler may insert clustering code at points in the program where the clustering changes. In such embodiments, the compiler may insert clustering code that maps an object to one cluster at one point in the program but to another cluster at a different point in the program.

In some embodiments, the compiler may optimize the transaction code to avoid redundant acquisitions of various STM locks, as in 520. In optimization phase 520, the compiler may redirect the lock acquisition and release operations of the objects in the cluster to target the cluster lock rather than different respective locks. In some embodiments, the compiler may perform additional optimizations, such as ensuring that the cluster lock is acquired and released at most once within a transaction so that the program does not redundantly attempt to acquire and release the same cluster lock within a given transaction attempt. Various other optimizations are possible.

In 530, the lock-clustering compiler outputs the executable program code. The executable program code may correspond to optimized executable code 130 of FIG. 1. The code may be executed within an execution environment (e.g., execution environment 140) to produce output/behavior (e.g., output 150).

In some embodiments (e.g., those employing JIT techniques), the compiler may continue to receive clustering information at runtime, such as from a runtime system as described above. The dynamic clustering information the compiler receives may enable the compiler to recognize that additional clustering may be beneficial and/or that previously performed clustering has been too aggressive. In either case, the runtime system may trigger the compiler to recompile various portions of the code to take advantage of the new information. In some embodiments, the compiler may recompile portions of the code in response to receiving dynamic clustering information from additional profiling runs.

In the illustrated embodiment, the runtime system (e.g., an STM contention manager component) may detect that there is high contention among concurrent transactions for one or more of the cluster locks, as in 540. High contention for a given cluster lock may be manifested by long wait times for the cluster lock, by high abort rates triggered by accesses to the clustered objects, and/or by other symptoms.

In response to detecting a high-contention situation (as indicated by the affirmative exit from 540), the system may trigger the lock-clustering compiler to remove one or more of the objects from the cluster, as in 550. That is, in 550, the compiler may recompile the code, or a section of the code, such that an object that was in the cluster is remapped to a different lock (i.e., a lock other than the cluster lock). The compiler may choose any reconfiguration for the new lock assignments. After recompiling the portion of code to decluster one or more objects (as in 550), the compiler may optimize the new code (as in 520) and output new executable program code (as in 530) that can be inserted into the running program.

In some embodiments, the compiler may "recompile" the code by replacing the section of code with a previously compiled version rather than actually re-performing the recompilation process. Because the compiler does not have to perform a full recompilation, the compiler may revert quickly to a less aggressive version of the code that may cause less contention.

According to method 500, if there is not high contention (as indicated by the negative exit from 540), the compiler may simply wait (as indicated by the feedback loop from 540 to 540). If the compiler receives an indication that new clusters exist and/or that recompilation with more aggressive clustering would be beneficial, it may attempt to recompile the code to exploit the identified clusters (as indicated by the feedback loop from 540 to 500). As before, the compiler may optimize the recompilation by replacing code with a previously compiled version that is more aggressive.

Figure 6:
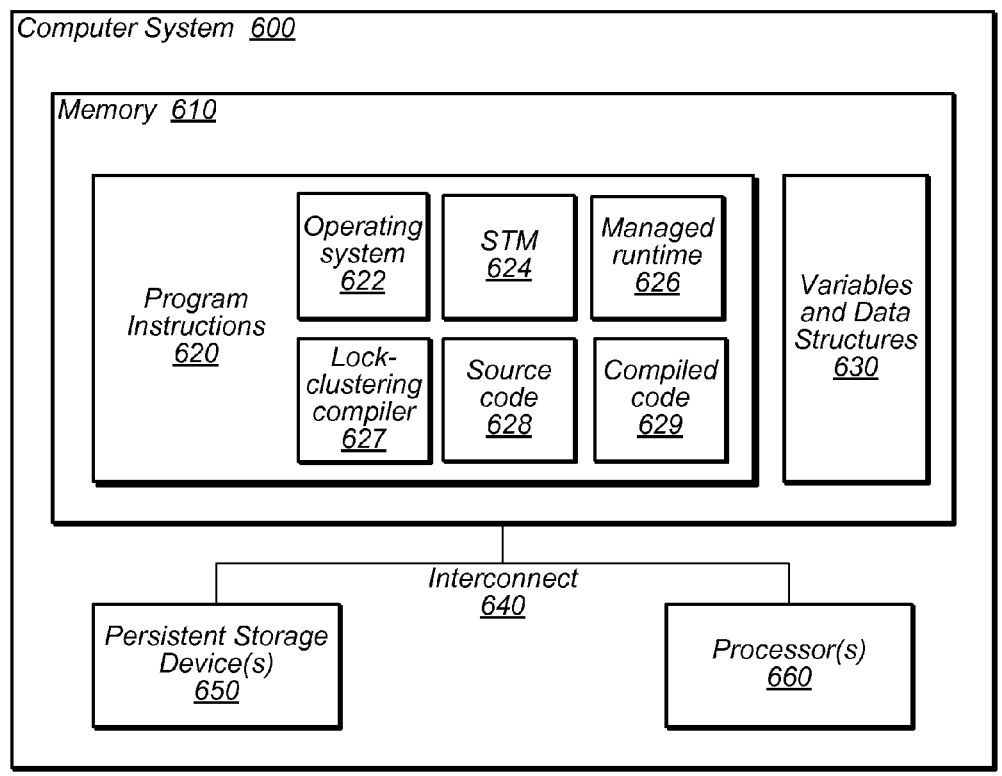
FIG. 6 is a block diagram illustrating a computing system configured to implement the systems and methods described herein, according to various embodiments.

FIG. 6 is a block diagram illustrating a computing system configured to implement the systems and methods described herein, according to various embodiments. The computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The lock-clustering compiler and/or other components described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In some embodiments, the program instructions may be communicated using transitory media, such as optical, acoustical or other form of propagated signal (e.g., carrier waves, infrared signals, digital signals, etc.)

Computer system 600 may include one or more processors 660, each of which may include multiple cores, any of which may be single or multi-threaded. The computer system 600 may also include one or more persistent storage devices 650 (e.g. optical storage, magnetic storage, hard drive, tape drive, solid state memory, etc) and one or more memories 610 (e.g., one or more of cache, SRAM, DRAM, RDRAM, EDO RAM, DDR RAM, SDRAM, Rambus RAM, EEPROM, etc.). Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

The one or more processors 660, the storage device(s) 650, and the system memory 610 may be coupled to the system interconnect 640. One or more of the system memories 610 may contain program instructions 620. Program instructions 620 may be encoded in platform native binary, any interpreted language such as Java™ byte-code, or in any other language or in any combination thereof.

Program instructions 620 may include program instructions executable to implement an operating system 622, a software transactional memory system 624, a managed runtime 626, a lock clustering compiler 627, program source code 628, and compiled code 629. Lock-clustering compiler 627 may correspond to compilers 120 or 200 and may be configured to perform lock-clustering compilation, such as shown in FIG. 5. Lock-clustering compiler 627 may be configured to perform JIT compilation and/or to receive memory access profiles, as described herein. Managed runtime 626 and/or STM 624 may include dynamic memory monitoring frameworks configured to monitor the dynamic memory access patterns performed by executing compiled code 629. In response to detecting that compiled code 629 is too aggressive or not aggressive enough regarding various locks, the monitoring framework may trigger lock-clustering compiler 627 to perform JIT recompilation when appropriate. Program instructions 620 may include software components and/or mechanisms configured to provide functions, operations and/ or other processes associated with implementing lock-clustering compilation, as described herein. Program instructions 620 may include additional, not pictured, software components for supporting such functions, such as shared software libraries The system memory 610 may further comprise variables and data structures 630. Variables and data structures 630 may include data created and/or used by any components defined by program instructions 620, such as locks, lock records, pointers, lockable in-memory objects, etc.

Although the embodiments above have been described in considerable detail, numerous variations and modifications will become apparent to those skilled in the art once the above disclosure is fully appreciated. For example, the lock-clustering mechanisms described herein may be used in conjunction with any type of locks, including conventional and/or read/ write locks. In some embodiments, different variations of read/write locks may be used, such as SNZI. Alternatively, clustering may be implemented using TL2-style versioned write locks. It is intended that the following claims be interpreted to embrace all such variations and modifications.

What is claimed:

1. A non-transitory computer-readable storage medium storing program instructions executable by one or more processors to implement:

a compiler configured to compile program code for execution on a software transactional memory system, wherein the compilation comprises:

recognizing by the compiler that a group of data structures is accessed together within one or more atomic memory transactions defined in the program code; and in response to the compiler recognizing that the group of data structures is accessed together within one or more atomic memory transactions defined in the program code, the compiler creating an executable version of the program code, wherein said compiler creating the executable version includes the compiler inserting a clustering code in the executable version of the program code, wherein the clustering code is executable to associate the data structures in the group with a same software transactional memory lock, wherein the lock is usable by the software transactional memory system to coordinate concurrent transactional access to the group of data structures by multiple concurrent threads.

2. The storage medium of claim 1, wherein said recognizing by the compiler that the group of data structures is accessed together comprises performing a static analysis of the program code without executing the program code.

3. The storage medium of claim 1, wherein said recognizing by the compiler that the group of data structures is accessed together comprises receiving profiling data from a previous execution of the program code.

4. The storage medium of claim 1, wherein said recognizing by the compiler that the group of data structures is accessed together comprises receiving, from a runtime environment, an analysis of dynamic memory access patterns performed by a previously compiled version of the program code.

5. The storage medium of claim 1, wherein associating each of the data structures with the same lock comprises writing metadata into a header of the data structure, wherein the metadata identifies the lock.

6. The storage medium of claim 5, wherein the metadata comprises an indication of a memory location of the lock.

7. The storage medium of claim 1, wherein associating each of the data structures with the same lock comprises manipulating a lock record to which the software transactional memory system maps the data structure.

8. The storage medium of claim 1, wherein the compiler is further configured to optimize the executable version by ensuring that the executable version does not include program instructions executable to attempt to acquire or release the lock more than once within the same one of the one or more atomic memory transactions.

9. The storage medium of claim 1, wherein the compiler is further configured to:
receive an indication at runtime that the program defined by the executable program code is experiencing contention for the lock; and
to respond to receiving the indication by recompiling at least a portion of the program code to associate at least one of the data structures with a different software transactional memory lock instead of with the lock.

10. The storage medium of claim 1, wherein the compiler is further configured to insert additional clustering code executable to associate at least one of the data structures with a different transactional memory lock instead of the lock.

11. A method of compiling a computer program code for execution on a software transactional memory system, the method comprising:
a computer executing a compiler program, the executing comprising:
recognizing by the compiler that a group of data structures is accessed together within one or more atomic memory transactions defined in the program code; and
in response to the compiler recognizing that the group of data structures is accessed together within one or more atomic memory transactions defined in the program code, the compiler creating an executable version of the program code, wherein said compiler creating the executable version includes the compiler inserting clustering code in the executable version of the program code, wherein the clustering code is executable to associate the data structures in the group with a same software transactional memory lock, wherein the lock is usable by the software transactional memory system to coordinate concurrent transactional access to the group of data structures by multiple concurrent threads.

12. The method of claim 11, wherein said recognizing by the compiler that the group of data structures is accessed together comprises:
performing a static analysis of the program code without executing the program code; or
receiving profiling data from a previous execution of the program code; or
receiving, from a runtime environment, an analysis of dynamic memory access patterns performed by a previously compiled version of the program code.

13. The method of claim 11, wherein associating each of the data structures with the same lock comprises writing metadata into a header of the data structure, wherein the metadata identifies the lock.

14. The method of claim 11, wherein associating each of the data structures with the same lock comprises manipulating a lock record to which the software transactional memory system maps the data structure.

15. The method of claim 11, further comprising: the computer optimizing the executable version by ensuring that the executable version does not include program instructions executable to attempt to acquire or release the lock more than once within the same one of the one or more atomic memory transactions.

16. The method of claim 11, further comprising:
the compiler receiving an indication at runtime that the program defined by the executable program code is experiencing contention for the lock; and
in response to receiving the indication, recompiling at least a portion of the program code to associate at least one of the data structures with a different software transactional memory lock instead of with the lock.

17. A system, comprising:
a processor;
a memory coupled to the processor and storing program instructions executable by the processor to implement a compiler configured to compile program code for execution on a software transactional memory system, wherein the compilation comprises:
recognizing by the compiler that a group of data structures is accessed together within one or more atomic memory transactions defined in the program code; and
in response to the compiler recognizing that the group of data structures is accessed together within one or more atomic memory transactions defined in the program code, the compiler creating an executable version of the program code, wherein said compiler creating the executable version includes the compiler inserting clustering code in the executable version of the program code, wherein the clustering code is executable to associate the data structures in the group with a same software transactional memory lock, wherein the lock is usable by the software transactional memory system to coordinate concurrent transactional access to the group of data structures by multiple concurrent threads.

18. The system of claim 17, wherein said recognizing by the compiler that the group of data structures is accessed together comprises:

performing a static analysis of the program code without executing the program code; or receiving profiling data from a previous execution of the program code; or receiving, from a runtime environment, an analysis of dynamic memory access patterns performed by a previously compiled version of the program code.

19. The system of claim 17, wherein associating each of the data structures with the same lock comprises:

writing metadata into a header of the data structure, wherein the metadata identifies the lock; or manipulating a lock record to which the software transactional memory system maps the data structure.

20. The system of claim 17, wherein the compiler is further configured to:

receive an indication at runtime that the program defined by the executable program code is experiencing contention for the lock; and to respond to receiving the indication by recompiling at least a portion of the program code to associate at least one of the data structures with a different software transactional memory lock instead of with the lock.

* * * * *

UNITED STATES PATENT AND TRADEMARK OFFICE
CERTIFICATE OF CORRECTION

PATENT NO. : 8,677,331 B2  
APPLICATION NO. : 13/250369  
DATED : March 18, 2014  
INVENTOR(S) : Marathe et al.

Page 1 of 1

It is certified that error appears in the above-identified patent and that said Letters Patent is hereby corrected as shown below:

On title page 2, column 1, References Cited under Other Publications, line 3, delete "Geneartion" and insert -- Generation --, therefor.

In the Specification

In column 10, line 34, delete "libraries" and insert -- libraries. --, therefor.

Signed and Sealed this  
Eighth Day of July, 2014

Michelle K. Lee  
*Deputy Director of the United States Patent and Trademark Office*